Patented Jan. 31, 1928.

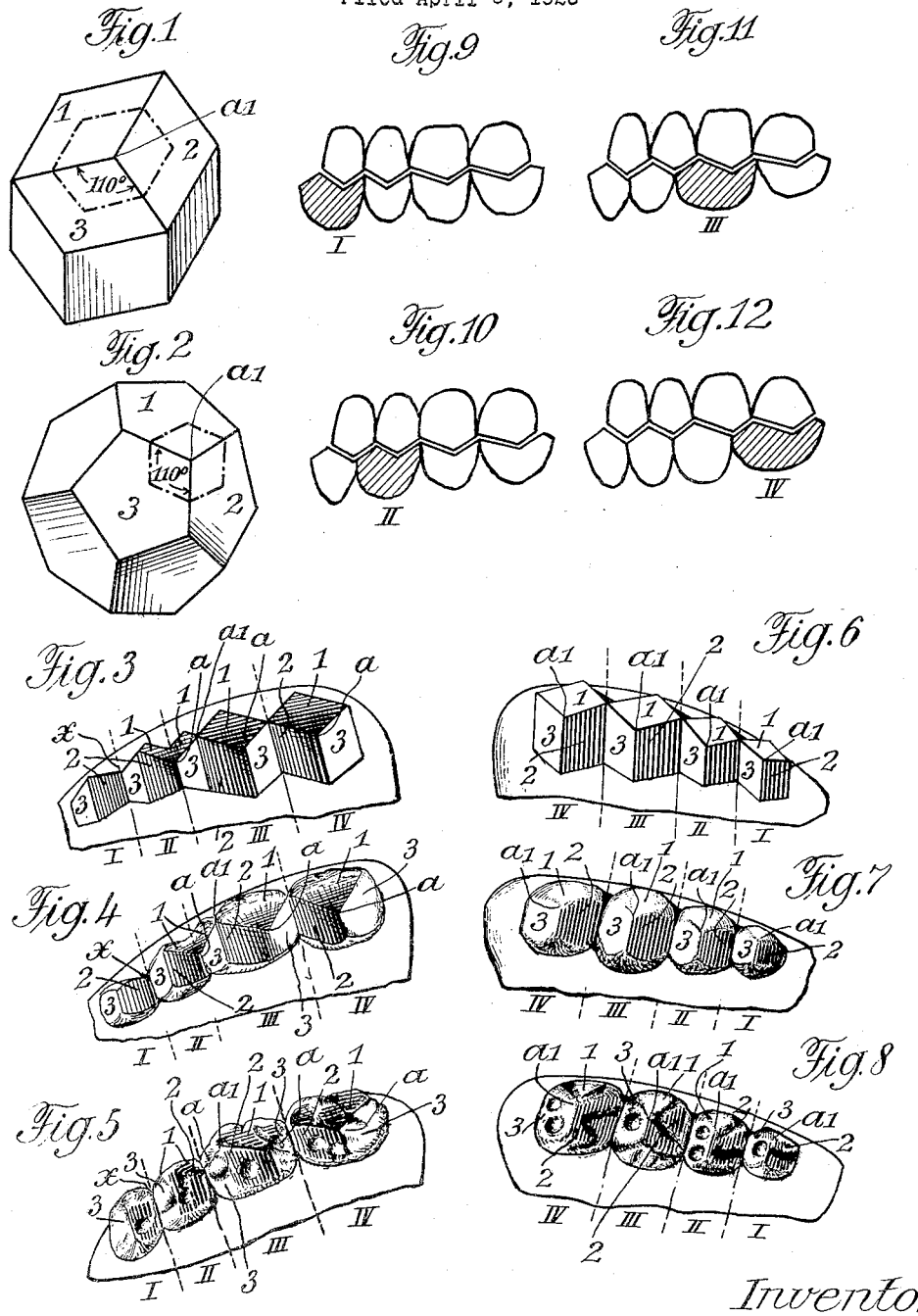

1,657,673

UNITED STATES PATENT OFFICE.

ALFRED GYSI, OF ZURICH, SWITZERLAND.

ARTIFICIAL MOLAR TOOTH.

Application filed April 8, 1925, Serial No. 21,604, and in Switzerland June 16, 1924.

The object of my invention is to provide a construction of model by the use of which artificial molar teeth, having obtuse positive and obtuse negative corners or cusps providing facets of special construction and relation, may be made to properly co-act in their occlusal relation to insure satisfactory mastication; and, moreover, whereby the construction so provided will permit the teeth to be utilized in dentures designed for jaws of normal position or for crossbite position, as the case may be.

The complete human set of teeth, excluding the so-called wisdom teeth, comprises sixteen molar teeth, four on each side of the upper as well as of the lower denture, each group of four molar teeth consisting of two smaller premolar teeth, (usually referred to as bicuspids), and two larger molar teeth proper, at the rear of these.

The subject matter of the present invention is a tooth model or form as to its occlusal surface and from which artificial molar teeth, molar and premolar, may be made, the same based on an original form in which there is provided at the masticating surface at least one obtuse corner formed by three facets or surfaces, adjacent surfaces meeting at angles of approximately 110°.

In the accompanying drawing structural examples are illustrated which show the construction of the model or form of the occlusal surfaces of a set of molar teeth.

Referring to the drawings: Fig. 1 shows the obtuse corner of a rhombic dodecahedron; Fig. 2 shows the same on a pentagon-dodecahedron; Fig. 3 is a model or pattern of a set of molar teeth for one side of a lower jaw at one stage of its manufacture; Fig. 4 shows the same at a second stage of its manufacture; Fig. 5 shows the finished set; Figs. 6, 7 and 8 show illustrations of the occlusal surfaces of the upper jaw corresponding to the same side of the jaw as Figs. 3, 4 and 5; and Figs. 9, 10, 11 and 12 show, in a diagrammatic manner, how molar teeth of different shape can be used in the lower jaw.

The rhombic dodecahedron has a number of obtuse corners and one of which, $a^1$, is bounded on the rhombic dodecahedron shown in Fig. 1 enclosed by dotted lines. In this corner the adjacent surfaces 1, 2 and 3 meet under angles of 110° each. The pentagon-dodecahedron shown in Fig. 2 has similar obtuse corners $a^1$.

The characteristic of the molar tooth is based on this original form, irrespective of whether it be a premolar or a molar, or intended for the upper jaw or the lower jaw.

With the molar teeth of the upper jaw the corner $a^1$ forms an elevation as may be seen from Figs. 6, 7 and 8. These teeth forms may be designated as teeth having a "positive" corner. With the molar teeth of the lower jaw the corner $a$ forms, as a rule, a depression; as is shown with the teeth III and IV of Figs. 3, 4 and 5. These teeth forms may be designated as teeth having a "negative" corner. Premolars or bicuspids of the lower jaw may however be apparently "positive" as I and II in Figs. 3, 4 and 5 show, although they have originated from the original form having a negative corner.

The manner of manufacturing such artificial molar teeth is for example the following:

A suitable manner of producing the models for the right and left sides of the jaw and with the negative or depressed corners as the preliminary and original form from which may be cast a pattern for the molars of the upper jaw may be stated as follows: A well known form of articulator, such as the "Simplex", may be employed, said articulator having a lower or base part and an upper or articulated part so connected with the base as to permit a relative movement between the two parts which will correspond to the various movements which take place between the upper and lower jaws of a person, and to the lower of which parts is arranged a block of plaster of Paris and to the upper of which parts are secured suitable cutter blades and which are so positioned and arranged as to scrape or cut into the plaster of Paris block depressions when the two parts of the articulator are given various movements such as would occur between the upper and lower jaws of a human being when masticating, and such a block and knives may simultaneously produce the negative or depressed corners corresponding to the occlusal surfaces of both the right and left sets of molars for the lower jaw. The inclined facets or surfaces 1, 2 and 3 of the negative or depressed corners are insured to have the proper angles relatively to each other by properly shaping the knives or scrapers coupled with the special relative movements between the upper and lower parts of the articulator when moving it corresponding to the masticating requirements. In the drawings, Fig. 3, I have only indicated the formation of the molars for the right side of the jaw, but it will be understood that by duplicating the set of cutters or scrapers and making the plaster block sufficiently wide, the masticating molar surfaces may be simultaneously made to correspond to the left side molars as well as the right side molars, this being understood, as will be seen by reason of the fact that the plaster on the lower and left hand portions is broken away, as it will suffice for the purposes of the present application to show one set of molars alone. No claim is made in this particular application to the details of the articulator or its provision with cutters for forming the molars, as it will be understood that my invention would be equally present if the special corners (depressions or cusps, as the case may be) were specially cut by hand. It is manifest, however, that hand operations would be very difficult in practice, and consequently, it is far more satisfactory to utilize the articulator with suitably mounting cutters or scrapers for simultaneously cutting or shaping the various facets constituting the corners or depressions as a preliminary to the subsequent casting, in forming models of the molars having positive corners or cusps corresponding to the upper jaw. By using the negative or depressed corners obtained in this manner upon the occlusal surface as a casting mould, the plaster cast of the upper molar teeth having positive corners or cusps is obtained as shown in Fig. 6. With the lower premolars or bicuspids I and II the faces 1 are scraped away for the largest part so that these premolars do not become too broad. Thereby a pattern of the masticating surface of a set of upper molar teeth adapted to the molars for the lower jaw is obtained. $x$ denotes the spot in which the negative corner $a$ has been situated.

The teeth I and II appear now, as may be seen in Figs. 4 and 5 positive although in fact they are derived from the negative original form.

To this set of teeth a set of teeth in the upper jaw corresponds, as is illustrated in Figs. 6, 7 and 8, and having obtuse corners $a^1$, and the faces 1 being everywhere maintained.

The same method is used for making molars for the other half of the jaw so that four sets of plaster teeth are obtained, two right sets and two left sets.

By breaking the sharp edges the stages of manufacture illustrated in Figs. 4 and 7 are obtained with the two patterns and by providing recess in the faces 1, 2 and 3 the final forms illustrated in Figs. 5 and 8 respectively are obtained. These four finished sets of plaster teeth are then subdivided into four molar teeth each, i. e. into 16 single teeth. From these sixteen plaster teeth the moulds for producing the porcelain teeth are made according to the usual methods.

The lower molar III in Figs. 3, 4 and 5 is not similar to the lower molar IV. Whilst the latter has only one negative corner $a$ the molar III has a negative corner $a$ as well as a positive corner $a^1$ so that it is composed as it were, of one and a half molar teeth, as may be seen from the dotted division lines indicated in Figs. 3, 4 and 5. Such form of tooth may be placed at any position in the lower jaw and the set of molar teeth I—IV of the lower jaw must enclose at both ends the cooperating set of molar teeth I–IV inclusive of the upper jaw when the jaws are closed. Such a "one and a half tooth" having one positive and one negative corner may be located as tooth I (Fig. 9) or tooth II (Fig. 10) or tooth III (Fig. 11) or tooth IV (Fig. 12) as desired.

The teeth may be made for normal position of the jaws or for cross-bite position. The illustrated teeth are suitable for cross-bite position.

I have described my improved method and the article produced thereby in connection with apparatus which I deem to be best suited to the requirements of the invention and on account of economy is preferred in commercial practice, but I do not restrict or confine myself to the minor or secondary details either as to the method of procedure or the means employed in putting it into effect, as variations therein may be resorted to as matters for the skilled artisan and without a departure from the spirit of the invention.

In this application no claim is made to the method of producing models or tooth forms of co-acting upper and lower molar dentures, which consists in first forming in a plaster block depressions constituting negative obtuse corners corresponding to the molar teeth of one jaw and thereafter forming a second model of the molar teeth corresponding to the other jaw by casting a suitable material upon the first mentioned model, whereby an inverse counterpart is formed having obtuse positive corners, as said subject matter forms part of my application Serial No. 90,726 filed February 26, 1926, and, moreover, the present application is restricted to the molar model or tooth form in which the positive and negative corners of the occlusal surface are composed of three facets meeting each other at an angle of approximately 110° in the plane of the facets, whereby such positive corners correspond to a corner of a pentagon-dodecahedron, and the negative corner or depression is the inverse thereto.

I claim:

1. An artificial molar model or tooth form, which is provided on its surface corresponding to the masticating surface of an artificial tooth with an obtuse corner derived from an original form produced by three facets or faces meeting each other at an angle of approximately 110°.

2. The invention according to claim 1, wherein further, the obtuse corner is a positive corner whereby the same constitutes a cusp.

3. An artificial molar model or tooth form, which is provided on its surface corresponding to the masticating surface of an artificial tooth with an obtuse positive corner or cusp formed by three facets or faces meeting each other in a manner corresponding to the faces forming a corner of a pentagon-dodecahedron.

4. An artificial molar model or tooth form, which is provided on its surface corresponding to the masticating surface of an artificial tooth with a plurality of obtuse corners formed by three facets meeting each other at an angle of approximately 110°, one of which is a positive corner and another of which is a negative corner.

5. The invention according to claim 1, wherein further, the obtuse corner is a negative corner whereby the same constitutes a depression.

In testimony whereof, I have signed my name to this specification.

ALFRED GYSI.